US006894508B2

(12) United States Patent
Sanoner et al.

(10) Patent No.: US 6,894,508 B2
(45) Date of Patent: May 17, 2005

(54) APPARATUS AND METHOD FOR LOCATING OBJECTS BEHIND A WALL LINING

(75) Inventors: Hughes Sanoner, New Territories (HK); Desmond Wai Nang Tse, New Territories (HK); Ronald Tak Yan Yim, New Territories (HK)

(73) Assignee: Solar Wide Industrial Ltd., New Territories (HK)

( * ) Notice: Subject to any disclaimer, the term of this patent is extended or adjusted under 35 U.S.C. 154(b) by 0 days.

(21) Appl. No.: 10/462,832

(22) Filed: Jun. 17, 2003

(65) Prior Publication Data

US 2004/0000918 A1 Jan. 1, 2004

Related U.S. Application Data

(60) Provisional application No. 60/391,964, filed on Jun. 28, 2002.

(51) Int. Cl.[7] .......................... G01R 27/26; G01R 19/00
(52) U.S. Cl. .......................... 324/662; 324/67; 324/326
(58) Field of Search ................... 324/67, 225, 228–243, 324/326–329, 658, 662, 663, 671, 677, 686

(56) References Cited

U.S. PATENT DOCUMENTS

| 4,464,622 | A | * | 8/1984 | Franklin | 324/67 |
|---|---|---|---|---|---|
| 5,352,974 | A | | 10/1994 | Heger | 324/67 |
| 5,512,834 | A | * | 4/1996 | McEwan | 324/642 |
| 5,619,128 | A | | 4/1997 | Heger | 324/67 |
| 6,023,159 | A | * | 2/2000 | Heger | 324/67 |
| 6,215,293 | B1 | | 4/2001 | Yim | 324/67 |
| 6,249,113 | B1 | | 6/2001 | Krantz et al. | 324/67 |
| 6,259,241 | B1 | | 7/2001 | Krantz | 324/67 |
| 6,456,053 | B1 | * | 9/2002 | Rowley | 324/67 |

* cited by examiner

Primary Examiner—Vincent Q. Nguyen
(74) Attorney, Agent, or Firm—Leydig, Voit & Mayer, Ltd.

(57) ABSTRACT

A device for locating an object behind a wall lining includes a housing having a front portion fitting substantially in the palm of a user's hand. Operating switches are located in juxtaposition to the grip portion so as to be operable by the user without substantially altering grip on the housing. The device also includes a sensor including a first capacitor plate and a pair of second capacitor plates. The capacitor plates are arranged serially, and calibrated by a pulse width modulator and integrator. Operating electronics are incorporated into an application specific integrated circuit.

26 Claims, 10 Drawing Sheets

APPARATUS AND METHOD FOR LOCATING OBJECTS BEHIND A WALL LINING

BACKGROUND OF THE INVENTION

1. Field of the Invention

The invention relates to apparatus for locating objects behind a wall lining, and in particular wall framing such as studs. Such apparatus are commonly known as stud detectors. Such devices have also been developed to detect other objects within wall, ceiling and floor structures, such as AC wiring and metal pipes and rods. The invention also relates to a method for locating objects behind a wall lining.

2. Description of Prior Art

Wooden stud detectors are well known and rely on detecting changes in dielectric constants in capacitive sensors. Stud detectors are typically used by tradesmen to detect wall framing, such as studs or beams, that are hidden from view behind plaster or other wall coverings, by moving the detector across and closely adjacent a wall covering. A portable stud locating device is described in U.S. Pat. No. 4,099,118.

Known devices operate by detecting a change, or imbalance, in a capacitive sensor element which results from the presence of a stud, or other wooden object, behind the wall covering. A number of other factors can affect the capacitive sensor and thus the unit must be calibrated before each use. Factors that affect the capacitive sensor include the thickness of the wall covering and the presence of the operator's hand on the device.

In the device described in U.S. Pat. No. 4,099,118 calibration is implemented by charging a capacitor of high input impedance. However, capacitors do not maintain their charge indefinitely and charge leakage causes a loss of calibration. To ameliorate this problem, known stud detectors use comparatively expensive capacitors with a very low charge leakage. Even with an expensive low leakage capacitor extended use of the device leads to deviation of performance due to changes in calibration.

Furthermore, it can take several seconds to charge the capacitor to calibrate the device and there is a need for an improved calibration circuit to reduce the calibration time and thus improve the user-friendliness of such devices.

Another problem is that these devices need be easy to hold and use as any movement of the operator's hand will affect the calibration of the device.

It is often desirable to detect objects in difficult locations such as behind ceiling coverings, at the edges and corners of walls and behind objects in a room. This means that the device will possibly be held in a variety of orientations and moved in a variety of patterns during operation. The user may not have a direct line of sight to the indicators on the device and thus and is desirable to have indicators which are quickly and readily discernible.

SUMMARY OF THE INVENTION

It is an object of the present invention to provide a device and method for detecting objects behind a wall lining which meets the above-mentioned needs, or overcomes or at least ameliorates disadvantages with known devices.

It is also an object of the present invention to provide a device that detects the presence of objects such and AC wiring and metal pipes within wall, ceiling or floor structures.

It is a further object of the present invention to provide a selection method for detection of objects such as AC wiring and metal pipes within wall, ceiling or floor structures.

It is yet a further object of the present invention to provide a means for allowing a user to optimise the detection sensitivity of a device for different wall thicknesses.

According to a first aspect of the invention there is provided a device for locating an object behind a wall lining including:

- a housing having a front portion and a grip portion to fit the palm of a user's hand,
- a sensor for sensing an object behind a wall lining and providing an output signal representative of the proximity of the object to the device,
- a display on the front portion for indicating the location of the object,
- a controller positioned in the housing for receiving the output signal and providing an indication of the object location on the display, and
- one or more switches positioned adjacent the grip portion for allowing operation of said switches by the user without substantially altering a grip on the housing.

Preferably, the switches are positioned near an edge of the housing for operation by a thumb or index-finger of the user.

Preferably, the switches include an on-off push-button and a sensitivity push-button.

Preferably, a sensitivity indicator and an on-off indicator are positioned on the front portion and wherein the detection indicator, sensitivity indicator, and operation indicator are color diverse.

According to a second aspect of the invention there is provided a device for locating an object behind a wall lining including:

- a sensor comprising a first capacitor having a first capacitance, and a pair of second capacitors having a second capacitance and positioned on opposite sides of the first capacitor,
- a detection circuit coupled to the sensor for providing a signal proportional to an imbalance between the first and second capacitances,
- a display for indicating the location of an object behind a wall lining,
- a controller for receiving the signal and providing an indication of the object location on the display, and
- a pulse train and an integrator for providing a calibration voltage to the sensor.

Preferably, the device includes a Pulse Width Modulator for generating the pulse train, and wherein a duty cycle of the Pulse Width Modulator is controlled by the microcontroller.

Preferably, the sensor includes at least two resistors in electrical communication with the first capacitor and pair of second capacitor to provide two resistor-capacitor networks, and wherein an output of the integrator biases the two resistor-capacitor networks.

Preferably, the detection circuit, controller, Pulse Width Modulator and integrator are formed in an Integrated Circuit.

According to a third aspect of the invention there is provided a device for locating an object behind a wall lining including:

- a sensor comprising a first capacitor having a first capacitance, and a pair of second capacitors having a second capacitance and positioned on opposite sides of the first capacitor, a detection circuit having an amplifier and coupled to the sensor for providing a signal proportional to an imbalance between the first and second capacitances, a display for indicating the location of an object behind a wall lining, and a controller for receiving the signal and providing an indication of the object location on the display, and a switch for selecting a gain for the amplifier.

According to a forth aspect of the invention there is provided a device for locating an object behind a wall lining including:

a sensor comprising a first capacitor having a first capacitance, and a pair of second capacitors having a second capacitance and positioned on opposite sides of the first capacitor, a detection circuit coupled to the sensor for providing a signal proportional to an imbalance between the first and second capacitances, a comparator for comparing the signal to a reference signal and providing an output, a display for indicating the location of an object behind a wall lining, a controller for receiving the output and providing an indication of the object location on the display, a user selection means for selecting the reference signal for the comparator.

Preferably, the user selection means is a push button.

Preferably, the detection circuit includes an amplifier having a gain, and the device further includes a second user selection means for selecting the gain for the amplifier.

According to a fifth aspect of the invention there is provided a method of detecting objects behind a wall lining including:

providing a sensor including at least two resistors, a first capacitor and a pair of second capacitors in electrical communication to provide two resistor-capacitor networks, the two resistor-capacitor networks having resistor-capacitor time constants, providing a pulse train having a duty cycle, and an integrator for applying a voltage to the two resistor-capacitor networks, providing a detection circuit and controller for detecting an imbalance in the resistor-capacitor time constants, and sensing an imbalance in the resistor-capacitor time constants and manipulating the duty cycle to ameliorate the imbalance.

Preferably, the device further includes sensing a second imbalance in the resistor-capacitor time constants caused by an object behind a wall lining and displaying a signal proportional to the second imbalance.

Preferably, the pulse train is provided by a Pulse Width Modulator, and wherein the integrator is connected to the output of the Pulse Width Modulator.

According to a sixth aspect of the invention there is provided a device for locating an object behind a wall lining including:

a sensor including a first capacitor and a pair of second capacitors to provide a first and a second capacitance, the sensor operable to change the first and second capacitances when proximate an object behind a wall lining;

a detector circuit for detecting an imbalance between the first and second capacitance and providing an output, a display for indicating the location of the object, a controller for receiving the output and providing an indication of the object location on the display, and wherein the pair of second capacitors are in electrical communication and positioned so that in use the pair of second capacitors are above and below the first capacitor.

Preferably, the first capacitor plate and the pair of second capacitor plates are formed on a Printed Circuit Board.

According to a seventh aspect of the invention there is provided a device for locating an object behind a wall lining including:

a sensor comprising a first capacitor having a first capacitance and a pair of second capacitors having a second capacitance, the pair of second capacitors being positioned on opposite sides of the first capacitor, a detector for providing a signal proportional to an imbalance between the first and second capacitances, a reference circuit for providing a reference, a comparator for comparing the signal to the reference and providing an output, a display for indicating the location of the object, a controller for receiving the output and providing an indication of the object location on the display, and an input device for allowing a user to vary the reference between two or more values.

Preferably, the values are optimised for two or more wall lining thicknesses selected from ½, ⅝, ¾, 1, 1¼ and 1½ inches.

Preferably, the reference circuit comprises a voltage divider having a plurality of resister elements connectable in parallel, the input device causing difference ones of the resister elements to be connected in parallel.

According to an eight aspect, of the invention there is provided a device for locating an object behind a wall lining including:

a first capacitor having a first capacitance, a pair of second capacitors having a second capacitance, the pair of capacitors being positioned on opposite sides of the first capacitor, a first detection circuit coupled to the capacitors for providing a first signal proportional to an imbalance between the first and second capacitances, a second detection circuit coupled to the capacitors for providing a second signal proportional to a alternating signal induced in the capacitors, a display for indicating the location of the object, and a controller for receiving the first or second signals and providing an indication of the object location on the display.

Preferably, the device further includes selection means for indicating to the controller which detection circuit is in use and to output to the display.

Preferably, the device further includes a ferrite core with at least two windings and a third detection circuit coupled to one of the windings for detecting a change in voltage of the windings, and selection means for indicating to the controller which detection circuit is in use and to output to the display. The selection mean can be a push button switch operable by a user.

Preferably, the selection means is a first push button operable by a user for selection between the first and second detection circuits and a second push button operable by the user for selection of the third detection circuit.

Alternatively, the selection means is a first push button operable by a user for selection between the first and third detection circuits and a second push button operable by the user for selection of the second detection circuit.

Preferably, the third detection circuit includes means for allowing current flow in two directions through the windings. The means for allowing current flow in two directions through the windings may include a diode and transistor. Alternatively, it includes back-to-back transistors.

According to an ninth aspect of the invention there is provided a device for locating an object behind a wall lining including:

- a first capacitor having a first capacitance,
- a pair of second capacitors having a second capacitance, the pair of capacitors being positioned on opposite sides of the first capacitor,
- a ferrite core with at least two windings,
- a first detection circuit coupled to the capacitors for providing a first signal proportional to an imbalance between the first and second capacitances,
- a second detection circuit coupled to one of the windings for detecting a change in voltage of the windings,
- a display for indicating the location of the object, and
- a controller for receiving the first or second signals and providing an indication of the object location on the display.

Further aspects of the invention will become apparent from the following description, which is given by way of example only.

BRIEF DESCRIPTION OF THE DRAWINGS

The invention will now be described by way of example only, and with reference to the accompanying drawings in which.

DESCRIPTION OF THE PREFERRED EMBODIMENT

Figure 1:
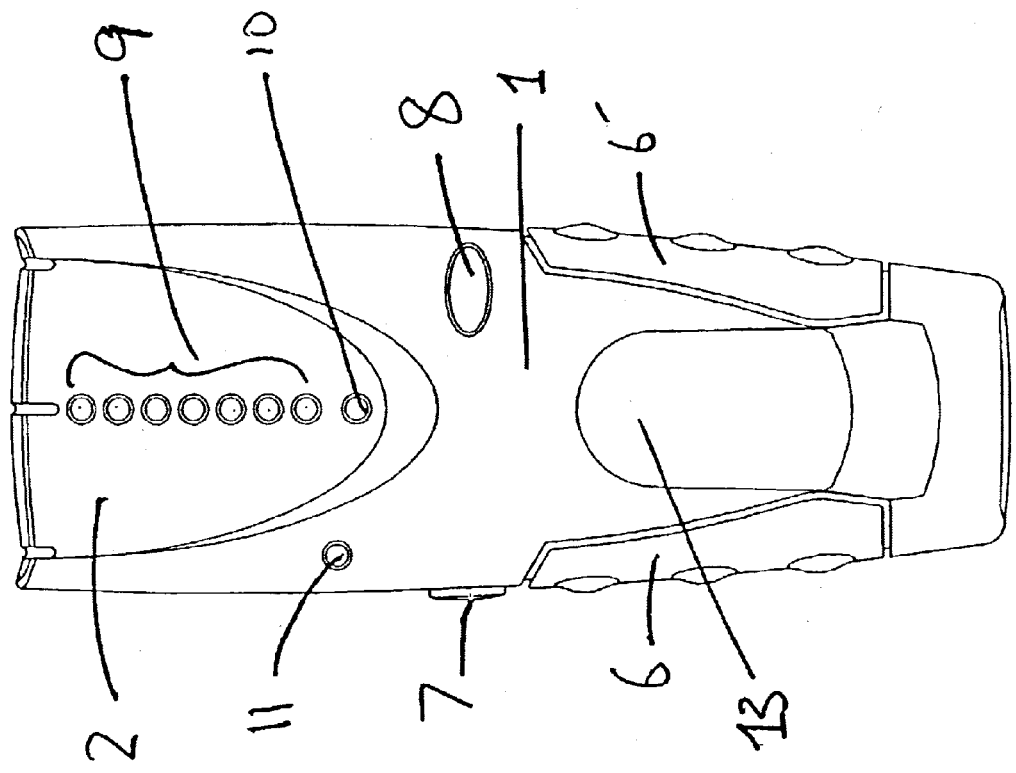
FIG. 1 illustrates a front view of a device according to the invention.
Figure 2:
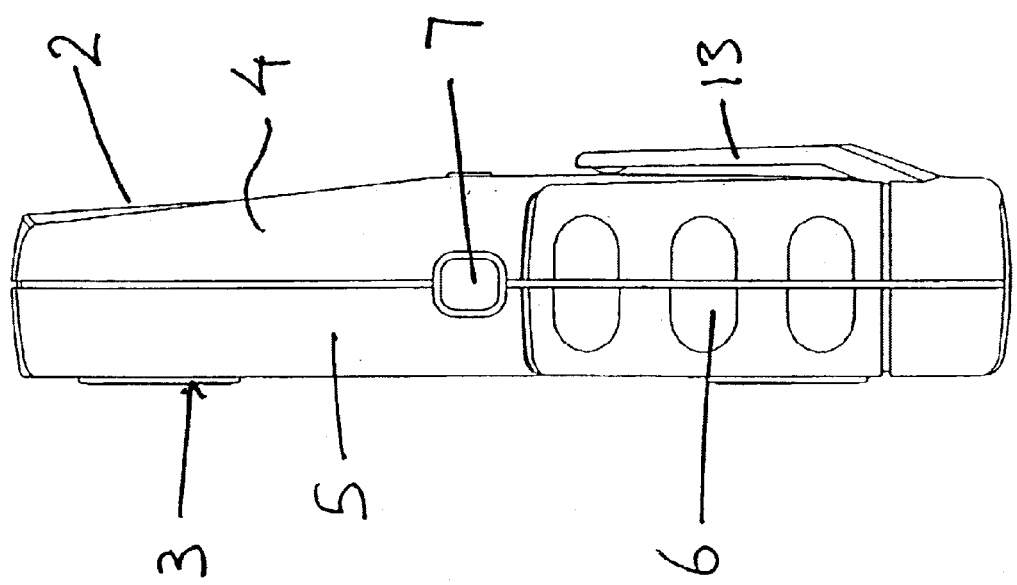
FIG. 2 illustrates a side view of the device.

Referring to FIGS. 1 and 2, a device for detecting objects behind a wall lining includes a housing 1 formed from front and rear housing elements 4, 5 that clip or secure together at an equator to enclose operating circuitry. The front element 4 includes a display area 2 and the back element 5 includes a detection face 3 that is placed against a wall covering. The housing 1 also includes a grip portion 6 that fits snugly and comfortably into the palm of a user's hand (not shown).

Proximate the grip portion 6 are operating controls which are located so they can be manipulated by the user's fingers or thumb without substantially altering or moving the grip on the device. A push button on-off operating switch 7 is located on the side of the housing proximate the grip portion 6 so that it can be operated by the thumb or index-finger of the user, depending upon which hand-left or right, the device is held in. A sensitivity push button switch 8 is located on the edge of front element 4 just above the grip portion 6 so that it can be operated by the user without altering the grip on the device. In use, the sensitivity push button switch 8 is depressed briefly while operating the on-off operating switch 7 to change the sensitivity of the device.

The location of the push button operating switches 7, 8 near the grip 6 allows the user to operate the device without substantially altering or moving his or her grip on the device. Because the user does not need to alter his or her grip position in order to operate switches 7, 8 the user can work the device without causing loss of calibration due to hand movements.

Located on a display 2 of housing 1 is an indicator for alerting the user when the device detects an object behind a wall lining. In the preferred embodiment the indicator comprises seven light emitting diodes (LEDs) 9. Also on display 2, below the indicator LEDs 9, is an operation (power on) LED 10. A sensitivity (mode) LED 11 is provided on the front housing element 4 next to the display 2. So as to make the display 2 easily discernible to the user the LEDs are different and distinctive colors. In the preferred embodiment the indicator LEDs 9 are red, the operation LED 10 is green and the sensitivity LED 11 is yellow, or orange. The user can quickly and easily distinguish the red indicator LEDs 9 from other LEDs on the display 2 of housing 1 at a glance when the device is orientated at various angles on a wall or ceiling.

In operation a first red indicator LED 9 illuminates to indicate the presence of an object behind the wall lining. As the distance between the object and the device decreases, i.e. the device moves closer to the object, further red indicator LEDs 9 illuminated progressively. All seven red indicator LEDs 9 illuminate when the device moves over a first edge of the object behind the wall lining. The device also has a buzzer 26 to provide an audible alert. The buzzer sounds when all seven indicators LEDs 9 are illuminated. As the object is moved over the object all LEDs 9 and the buzzer remain on. As the object passes the second edge of the object the buzzer stops, and the seven LEDs 9 progressively turn off to indicate that the device is moving away from the object.

In a first alternative embodiment the seven indicator LEDs 9 are different and distinctive colors so that the user can read the distance to the object at a glance. For example the first three LEDs 9 are red, the second three LEDs 9 are yellow/orange, and the seventh LEDs 9 is green. One or more red LEDs 9 indicate that an object has been detected.

Three Red and one or more orange LEDs 9 indicate that the devise has moved closer to the object. The green LED 9 indicates that the device is over the edge of the object behind the wall lining. In another embodiment there are only three LEDs 9. They are different colors, i.e. red, yellow/orange, and green and illuminate consecutively one at a time. A red LED indicate that an object has been detected, an orange LED indicates that the device has moved closer to the object and a green LED indicates that the device is over the edge of the object. Thus the user can determine proximity at a glance by color without the need to focus on the number of LEDs 9 that are illuminated.

Figure 12:
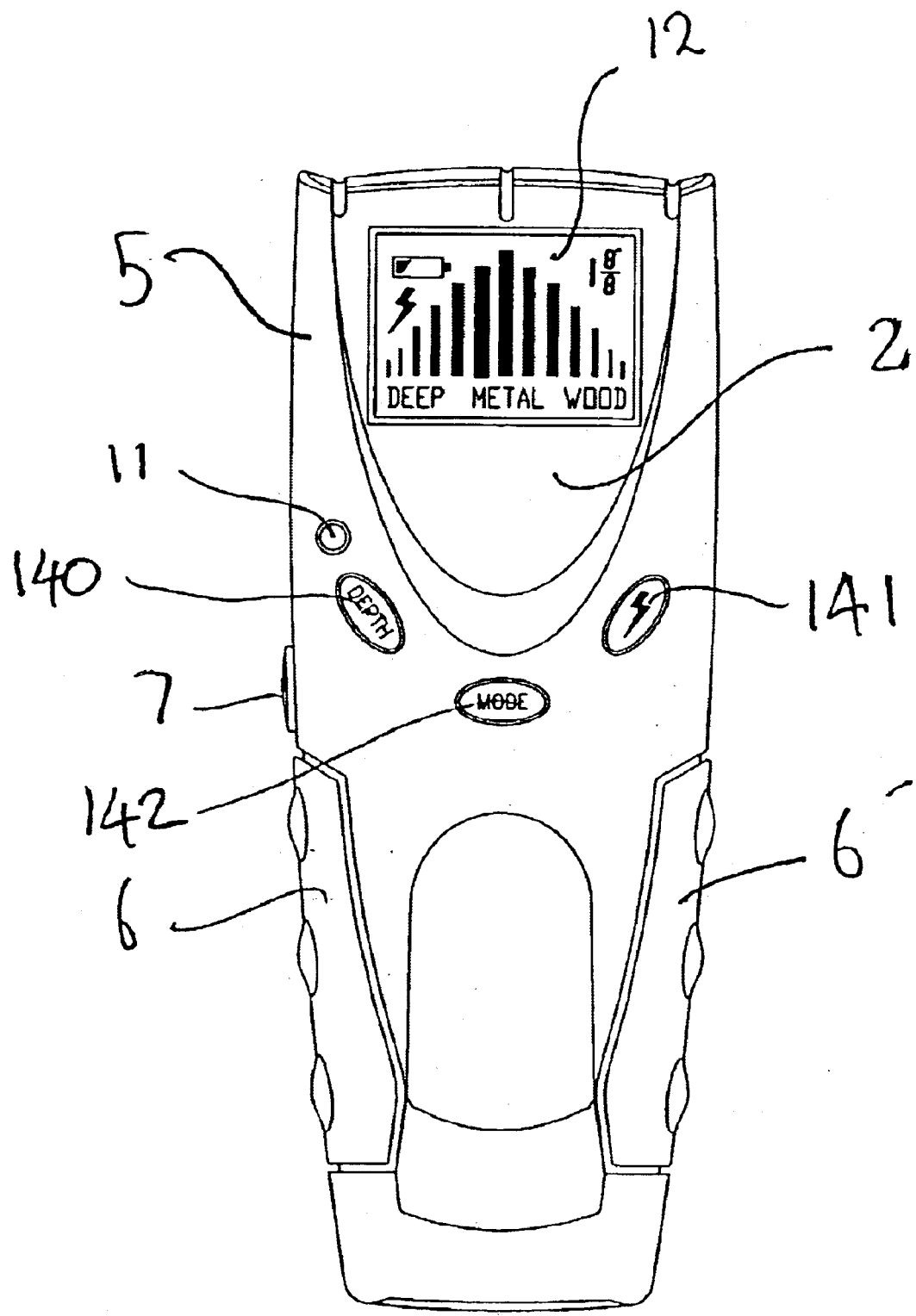
FIG. 12 is an alternative embodiment of a device according to the invention.

In yet further embodiments, as shown in FIG. 12, the indicator is a liquid crystal display (LCD). The LCD also includes operation and mode indicators.

The housing 1 also includes a belt clip 13 so that the device can be easily carried on a tradesman's tool belt.

Figure 3:
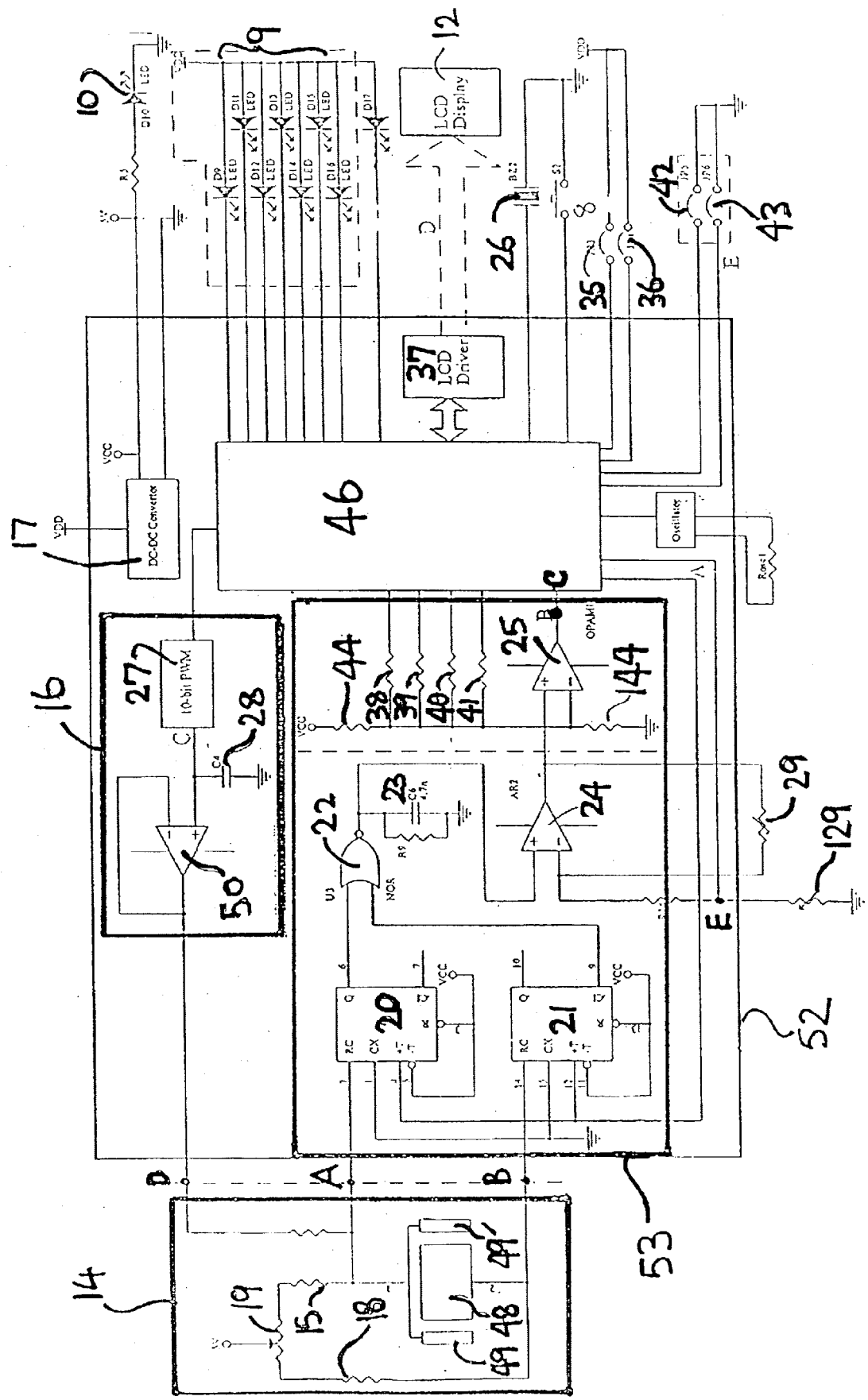
FIG. 3 illustrates electronic circuitry for the device.

FIG. 3 illustrates a circuit diagram of the electronics of the device. The electronics include a micro-controller 46, a detector circuit 53, sensing element 14, and a calibration circuit 16. A converter 17 provides a power source for the electronics from a portable power source such as a battery (not shown).

Figure 4:
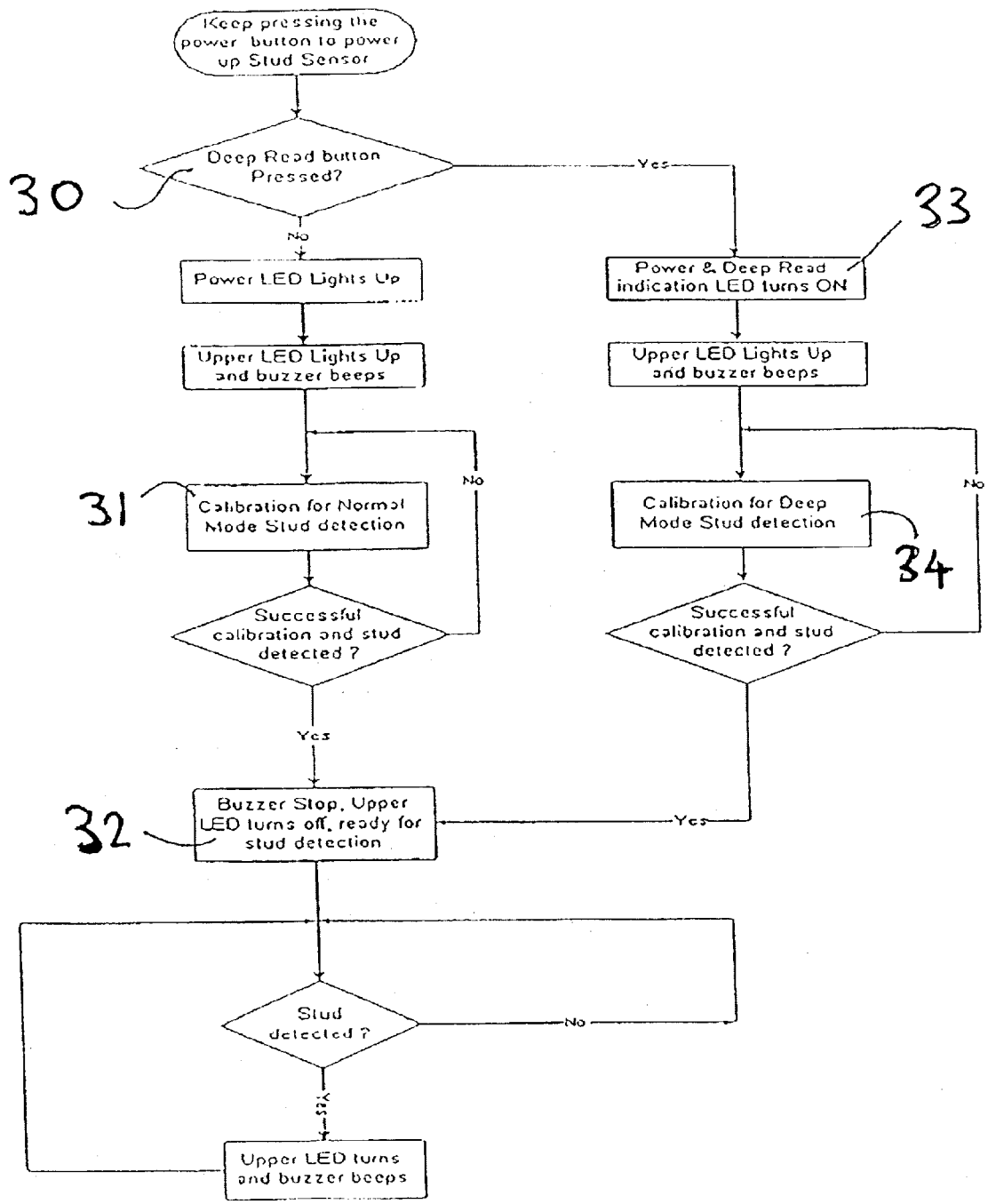
FIG. 4 illustrates operating steps of the device.

The micro-controller 46 provides overall control of the device according to the flow diagram shown in FIG. 4. It receives and process detection signals from detector circuit 53, manipulates calibration circuit 16 to provide a DC bias voltage to sensor element 14 and outputs alert signals via LEDs 9, or LCDs 12 as the case may be, and buzzer 26. Micro-controller 46 also manipulates four comparator reference resistors 38, 39, 40, 41 as will be described later.

A drywall sensor element 14 is used to detect wood and metal object, such as wall framing, behind a sheet of surface material applied to the framing. The sensor element includes a first capacitor plate 48, a pair of electrically connected second capacitor plates 49, 49', two fixed resistors 15, 18, and a variable (calibration) resistor 19. The capacitor plates 48, 49, 49' are formed on a PCB which is arranged so as to be in juxtaposition detection face 3 in the assembled device.

Figure 5:
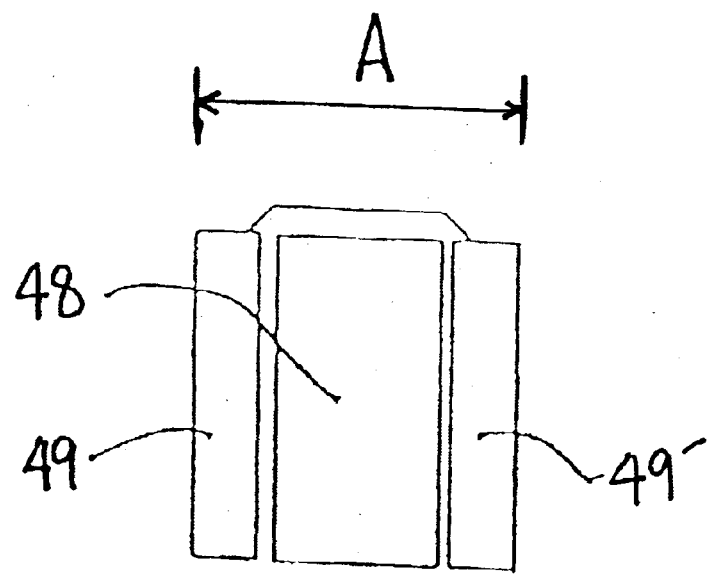
FIG. 5 is a first example of a sensor element for detecting objects behind a surface material applied to wall or ceiling framing.

FIG. 5 illustrates a first drywall sensor element in which the pair of capacitor plates 49, 49' are electrically connected and arranged one either side of the first capacitor plate 48. This defines two capacitors. The first capacitor plate 48 defines a first capacitor, and the pair of capacitor plates 49, 49' define a second capacitor. The capacitance of the first and second capacitors varies due to stray capacitance contributed to by the dielectric constant of nearby objects. The difference in change of capacitance of the two capacitors is processed to determine the location of the object behind the wall surface material. The device operates by detecting an imbalance in the capacitance of the two capacitors as the device comes into proximity with an object behind the wall surface. The capacitor plate arrangement shown in FIG. 5 is sufficient for detecting objects behind the standard wall lining thickness available in the United States of ½-inch, ⅝-inch and ¾-inch.

Figure 6:
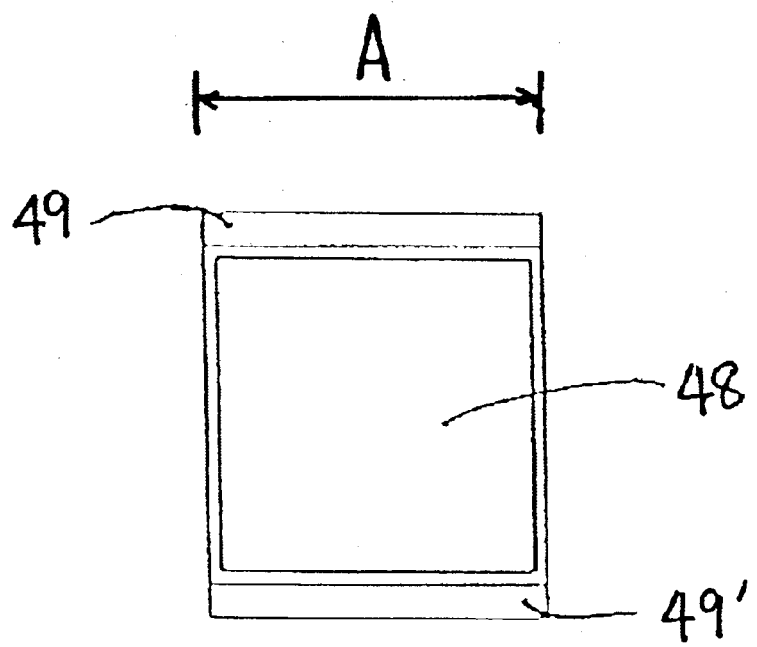
FIG. 6 is a second example of a sensor element for detecting objects behind a surface material applied to wall or ceiling framing.

The width of the sensing element is confined in dimension 'A', shown in FIGS. 5 and 6, by two factors. Firstly, by the physical size of the object to be detected. In most cases this is wall framing, such as studs, which have a width of about 1.5 inches. And secondly, by the practical width of the device so that it will fit snugly in a user's hand. These limitations on the width of the sensing element limit sensitivity of the device.

In a preferred embodiment of the device the stud sensor element is rotated 90-degrees as illustrated in FIG. 6. The 90 degree rotation results in a substantially vertical arrangement of the capacitor plates 48, 49/49' which gives better detecting performance through thick wall lining, for example more than ¾ inches thick. In the configuration shown on FIG. 5 the presence of the pair of capacitor plates 49/49' within a horizontally narrow width 'A' makes this design unable to detect an object through thick all lining, for example more than ¾ inches thick. The 90-degree rotated sensor element does not have this limitation. The first capacitor plate 48 is larger making the balance of the two capacitances more sensitive to the presence of an object behind the wall lining so the device can operate satisfactorily with wall surface thickness of up to one and a half (1½) inches thick.

Referring to FIG. 3, the capacitor plates 48, 49/49' and resistors 15, 18 constitute two resistor-capacitor (RC) circuits at nodes A and B. One RC circuit comprises capacitor plate 48 and resistor 15 and the other comprises capacitor plates 49/49' and resistor 18. Variable resistor 19 is used to balance the RC circuits during factory calibration. Nodes A and B are connected to respective inputs of two monostable vibrators 20, 21 of detector circuit 53. The monostable vibrators 20, 21 are triggered by the controller 46 and their respective outputs change state for a length of time determined by the time constant of the RC network at the respective input. The monostable vibrators 20, 21 convert the two RC time constants of the RC circuits into digital pulses of varying periods. The digital output pulses of the first monostable vibrator 20 and the inverted output of second monostable vibrator 21 are fed into the inputs of a NOR gate 22. As a result of high-to-low and low-to-high transitions of the two pulses, the output of the NOR gate 22 is voltage spikes that vary in height, amplitude, with the difference between the RC time constants of the two RC circuits. A capacitor 23 at the output of the NOR gate 22 integrates the voltage spikes to give a voltage level relative to the difference between the RC time constant of the two RC circuits. The voltage level from capacitor 23 is amplified by a non-inverting amplifier 24. The gain of amplifier 24 can be adjusted in known manner by two variable resistors 29 and 129.

The output of the amplifier 24 is compared with a voltage reference by a comparator 25. The output signal of the comparator 25 is provided to the micro-controller. Depending on the output level of comparator 25 the micro-controller 46 illuminates indicator LEDs 9 for each proximity stage. A buzzer 26 is turned on when amplifier 24 output reaches the maximum voltage reference.

The reference voltage for comparator 25 is provided by a voltage divider comprising resistors 144, 44, 38, 39, 40, and 41. The sensitivity of the device is pre-selected via selection means in the form of jumpers 42, 43. The Jumpers 42, 43 allow the factory or supplier to pre-configure the device to a sensitivity optimised to the standard wall covering thickness available in the United States. These are ½-inch, ⅝-inch and ¾-inch. Depending on the combination of jumpers 42, 43 made the micro-controller switches one or more of comparator resistors 38, 39, 40, 41 which form a voltage divider with resistors 44, 144 to set the reference voltage for comparator 25. In an alternative embodiment a push button is provided on the exterior of the device to allow the user to optimise the device to the wall thickness before end use.

At power-up the unit self-calibrates by applying a DC Bias voltage to input node D of the RC circuits of sensor element 14. The calibration circuit comprises a PWM module 27 and a capacitor 28 connected to the PWM module 27 output. The capacitor 28 acts as an integrator by smoothing, or averaging, the output pulses of the PWM module 27. To increase the DC bias level the duty cycle of PWM module 27 is increased. To reduce the DC bias the duty cycle of PWM module 27 is decreased. The DC Bias is applied through a voltage follower 50. Because the input impedance of the voltage follower 50 is very high it isolates the sensing element 14 from the PWM module 27 and capacitor 28 avoiding a "loading" effect which might affect the DC bias voltage level. The voltage follower 50 is not essential to the invention and the integrated output of PWM module 27 can be applied directly to the sensing element 14. The use of a PWM module 27 is an improvement over the prior art which makes use of a charged capacitor to provide the bias voltage. A charged capacitor suffers from voltage leakage. The PWM module 27 eliminates this shortcoming by providing a continual charging action for capacitor 28.

A factory calibration of the device is achieved by way of variable resistors 19 and 29 and 129. These allow balancing of the RC time constants to allow for manufacturing tolerances in the fixed resistors 15, 18 and capacitor plates 48, 49/49'. Initially variable resistor 19 is adjusted to match the pulses on the monostable vibrator outputs. Then variable resistors 29 and 129 are adjusted to change the sensitivity of the unit under normal and deep read modes by altering the gain of amplifier 24.

The circuit also includes a Liquid Crystal Display (LCD) driver 37 so that the electronics can be used in either the embodiment of FIG. 1 or an alternative embodiment shown in FIG. 12. The micro-controller outputs display signals to the LED 9 connections and LCD driver 37 simultaneously and regardless of which display method is being used. The desired display is simply connected to the appropriate output.

Selection means in the form of jumpers 35, 36 allow display configuration. In alternative embodiments the selection means are micro-switches, dip-switches and the like. Selection includes four or seven LED indicators in a bar graph or sequential display. Jumper 35 is used to indicate to the micro-controller whether 4 or 7 LEDs are connected. Jumper 36 is used to indicate whether the LEDs should be illuminated cumulatively in bar graph form as proximity of the object increases, or sequentially one at a time.

In the preferred embodiment the circuit elements within the region defined by frame 52 are incorporated into an Application Specific Integrated Circuit (ASIC)

Figure 7:
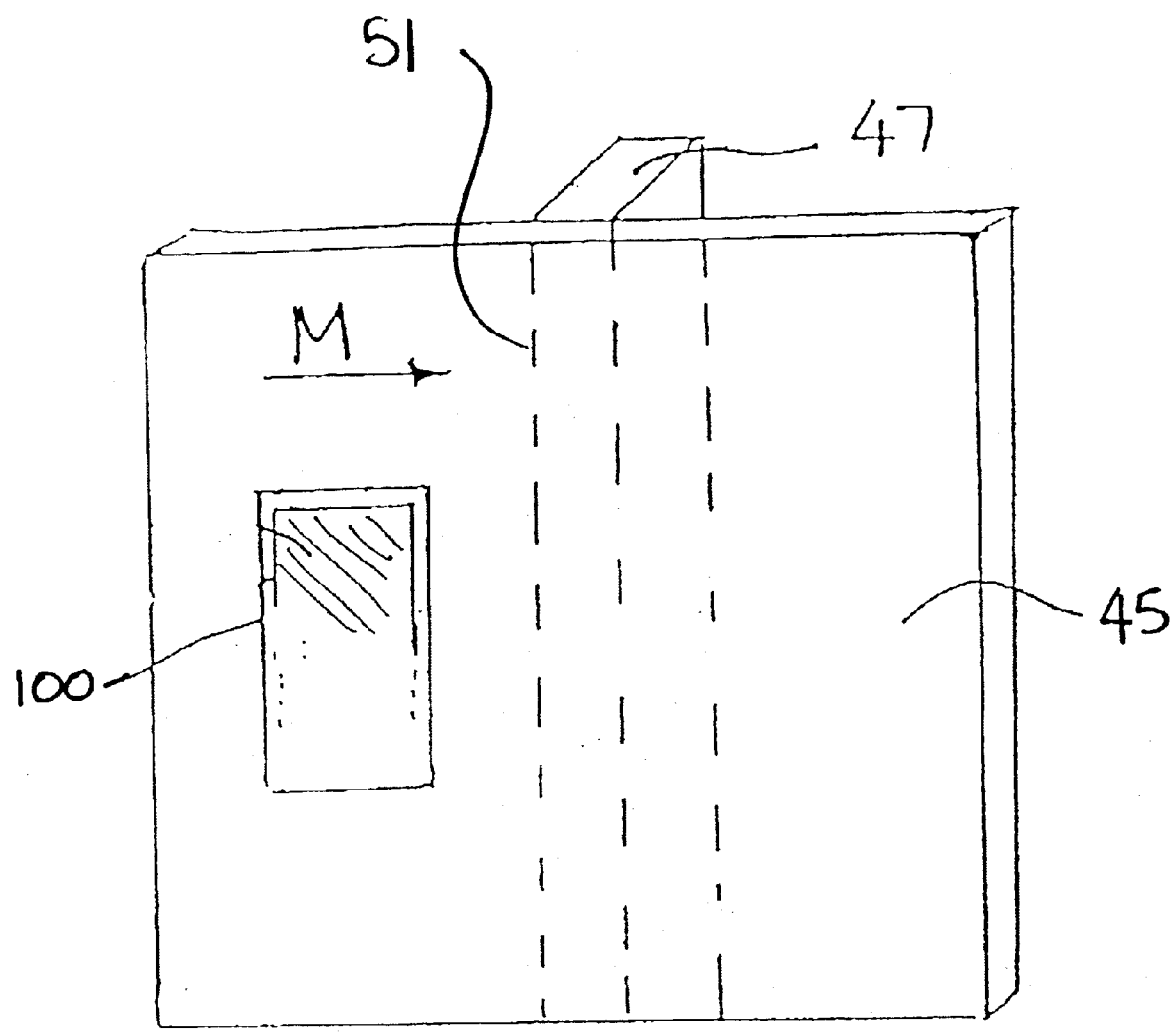
FIG. 7 illustrates use of the device to detect wall framing behind a surface material applied to it.

Basic Operation of the device is illustrated by the flow chart in FIG. 4 and by FIG. 7. When the user pushes the power-on button 7 the voltage line is made and power is provided to the electronic circuit of FIG. 3. The first step (step 30) is for the micro-controller to check if the deep read button 18 was pressed at power up.

If the deep read button was not pressed, on power up the power LED 10 illuminates, and one indicator LED 9 and buzzer 26 are operated to inform the user that the unit is not calibrated.

The two RC times on the sensor element 14 are initially different. Device must go through a calibration step 31.

To calibrate the device the bias voltage at node D is raised by increasing the duty cycle of the PWM module 27 to balance the RC time of the sensor (part of plate 49/49'). When the two RC times match the voltage at node D is kept constant so that the output voltage of amplifier 24 is just under the minimum reference voltage set by the comparator 25.

If the two RC times cannot be matched the calibration-step 31 is repeated. Failed calibration may be because the wall lining material is too thick or dense. The user should move the device to a new location on the wall surface.

If calibration is successful the one indicator LED 9 and buzzer 26 are turned off, indicating successful calibration to the user and readying the unit for detection (step 32).

Deep read button 8 provides a second selection means allowing the user to alter the sensitivity of the detector circuit 53. If the deep read button 8 is pressed at power-up, operation branches to deep read set-up (step 33). The sensitivity LED 11 illuminates to indicate deep read mode. During deep read calibration, the micro-controller grounds node E (FIG. 3) to increase the gain of amplifier 24 and thus increase the sensitivity of the device. The remaining calibration procedure is the same as for the normal mode (step 31). Increased sensitivity allows the device to detect objects through a greater thickness wall lining.

Referring to FIG. 7, the device is placed against a wall with the detection face 3 flat against the wall surface. The device is moved over the wall surface 45 as illustrated by arrow M. The proximity of a object, such as a stud 47, behind the wall material changes the stray capacitance of capacitors 48, 49/49' resulting in a variation of RC times at the two sensor nodes A and B. The variation in capacitance is related to the output voltage of amplifier 24. As the device moves closer to the object the variation in RC times increase and indicator LEDs 9 will light up successively. When the device reaches an edge 51 of the stud 47 the top comparator output is reached and all LEDs 9 are illuminated and the buzzer 26 will sound.

The above description relates specifically to detection of objects, such as wall framing, behind drywall i.e. where a surface material is applied to wall framing using dry construction methods. The sensor elements illustrated in FIGS. 5 and 6 will detect wood, metal and other materials behind the wall lining which change the stray capacitance of the capacitor plates 48, 49/49'.

There is also a need to detect electric wiring behind wall lining as well as metal reinforcing bars (commonly call rebar) and pipes installed in concrete and block walls and other structures. Embodiments of the invention may have circuits for detecting wires carrying alternating current (AC) and or metal objects installed in concrete or block structures.

Figure 8:
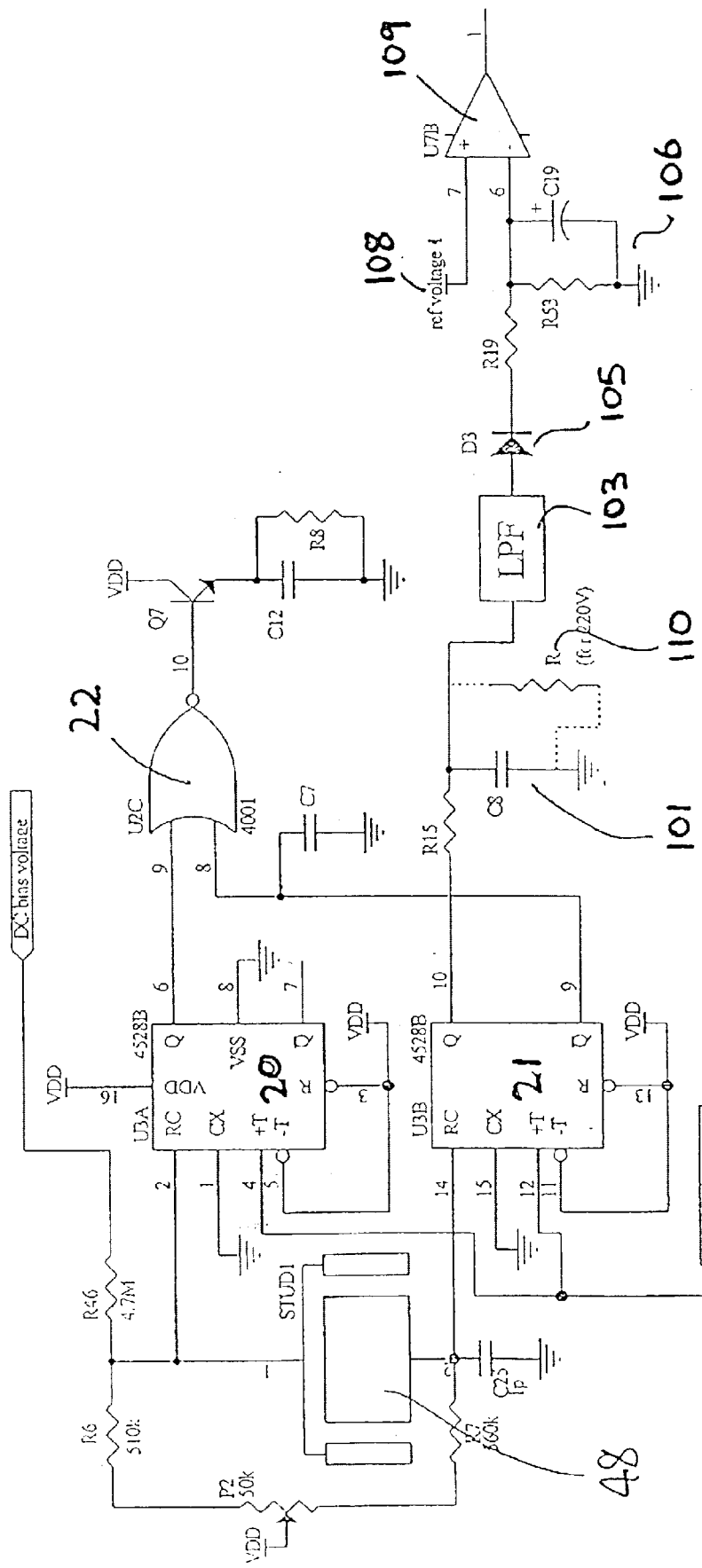
FIG. 8 illustrates a detection circuit for alternating current wiring.
Figure 9:
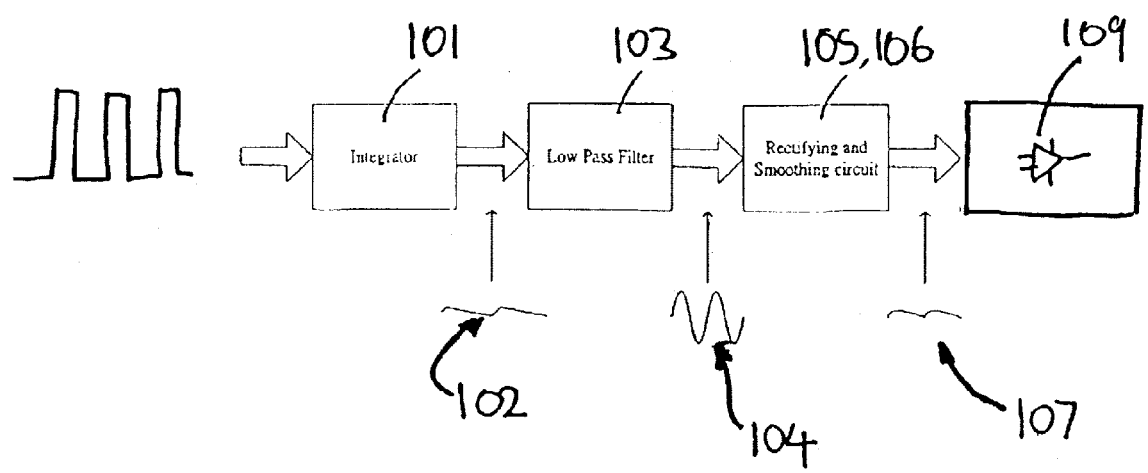
FIG. 9 is a schematic of signal conditioning of the detector circuit in FIG. 8.

In the USA the domestic electricity supply is 110 volts at 60 hertz (Hz). Referring to FIGS. 8 and 9, in an AC detection circuit the central capacitor plate 48 (used in wood detection) is also used for detecting AC live wires. The input of monostable 21 is connected to capacitor plate 48. The non-inverted output of the monostable 21 is used for AC wire detection (the inverted output is connected to the NOR gate 22 for drywall detection). When the capacitor plate 48 is proximate wiring carrying AC the pulse train signal from non-inverted output of the monostable 21 contains a 60 Hz jitter in its pulse width. The non-inverted output is connected to an integrator 101 to transform the pulse width jitter into a modulation in voltage magnitude 102. The integrator 101 output is filtered and amplified by a low pass filter (LPF) 103 to extract the 60 Hz signal component 104. The 60 Hz signal 104 is rectified by a diode 105 and smoothed by a filter 106 to produce a voltage signal 107. Voltage level 107 is compared to a reference voltage 108 by comparator 109. A voltage level change in the output of comparator 109 indicates the presence of AC carrying wires.

The circuit described above can also be used to detect AC wires in a 250 volt 50 Hz system. The circuit is modified by the addition of a resistor 110 in parallel with the capacitor of integrator 101 to reduce the detection sensitivity.

A magnetic field is generated by a current flowing in a conductor. Through electromagnetic induction eddy currents are induced in proximate metals objects. This reduces magnetic field strength. A metal detection circuit for concrete and block structures detects a change in magnetic field strength caused by the presence of metallic objects installed in the structure. Referring to FIG. 12, a detection circuit for metal objects in a concrete and block structures includes a ferrite sensor element 132, an oscillator 121, a rectifying integrator 122, a comparator 123 and a calibration circuit 124.

The ferrite sensor element 132 comprises a ferrite rod 125 with first and second coils 126, 127 wound side by side on the rod 125. The oscillator 121 produces an alternating magnetic field in the ferrite rod 125. A capacitor 128 is connected across the first coil 126 and forms an inductor-capacitor (LC) parallel resonant tank that determines the oscillating frequency of the magnetic field.

The second coil 127 serves two functions. Firstly, it provides feedback to the oscillator, and secondly it is connected to transistor 130 via a resistor 137 to provide the output to the ferrite sensor 132. The output from transistor 130 is compared to a reference voltage 128 by comparator 123 to determine the presence of metal objects in the proximity of the ferrite sensor 132. A diode 134 is connected across the second coil 127 in opposite polarity to transistor 130. Diode 134 allows current flow in both directions through second coil 127 and this reduces voltage drift against time of the transistor output and improves the performance of detection.

The stability of the transistor output after calibration is an important criterion for maximum sensitivity of detection. Positive voltage drift causes a loss of sensitivity and negative voltage drifts causes false detection. Both positive and negative drift are observed in known metal detection circuits using a ferrite core.

The sensing circuit must be calibrated to compensate for environmental factors, such as temperature and stray magnetic fields, before operation. Calibration is achieved by adjusting the DC bias voltage applied to the base of Junction Field Effect Transistor (JFET) 135. The calibration circuit 124 comprises a voltage divider network with a polarity of parallel resistors connected to the controller 46. The controller 46 adjusts the DC bias of JFET 135 by switching combinations of the polarity of parallel resistors to change the ratio, and hence output voltage, of the voltage divider network. The circuit is calibrated when the output of transistor 130 is just higher than the voltage reference 128.

If there is no metal in the proximity of sensing element 132 during calibration the sensitivity of the circuit is at a maximum. A decrease in the transistor 130 output voltage indicates a change in position of metallic object relative to the ferrite sensor 132.

The amplitude of oscillations in secondary winding 127 is directly related to the transformer magnetic field strength. When a metal object gets closer to sensor element 132 eddy currents are induced, or increase, in the metal object. This weakens the magnetic field reducing the amplitude of oscillations in secondary winding 127. The base and collector currents of transistor 130 reduce reducing the voltage across collector resistor 131. The voltage across collector resistor 131 is input to the comparator 123.

A fixed reference voltage 128 applied to the input of the comparator 123 provides fixed sensitivity for metal detection. This is adequate in some applications, but applying different voltage references to the comparator 123 results in different sensitivities, and therefore a gradual change in the rectifier 122 output can be monitored with a more illustrative user interface showing progression or closeness, as the detector approaches the metal object. The reference voltage can be adjusted using a voltage divide arrangement (not shown).

Figure 10:
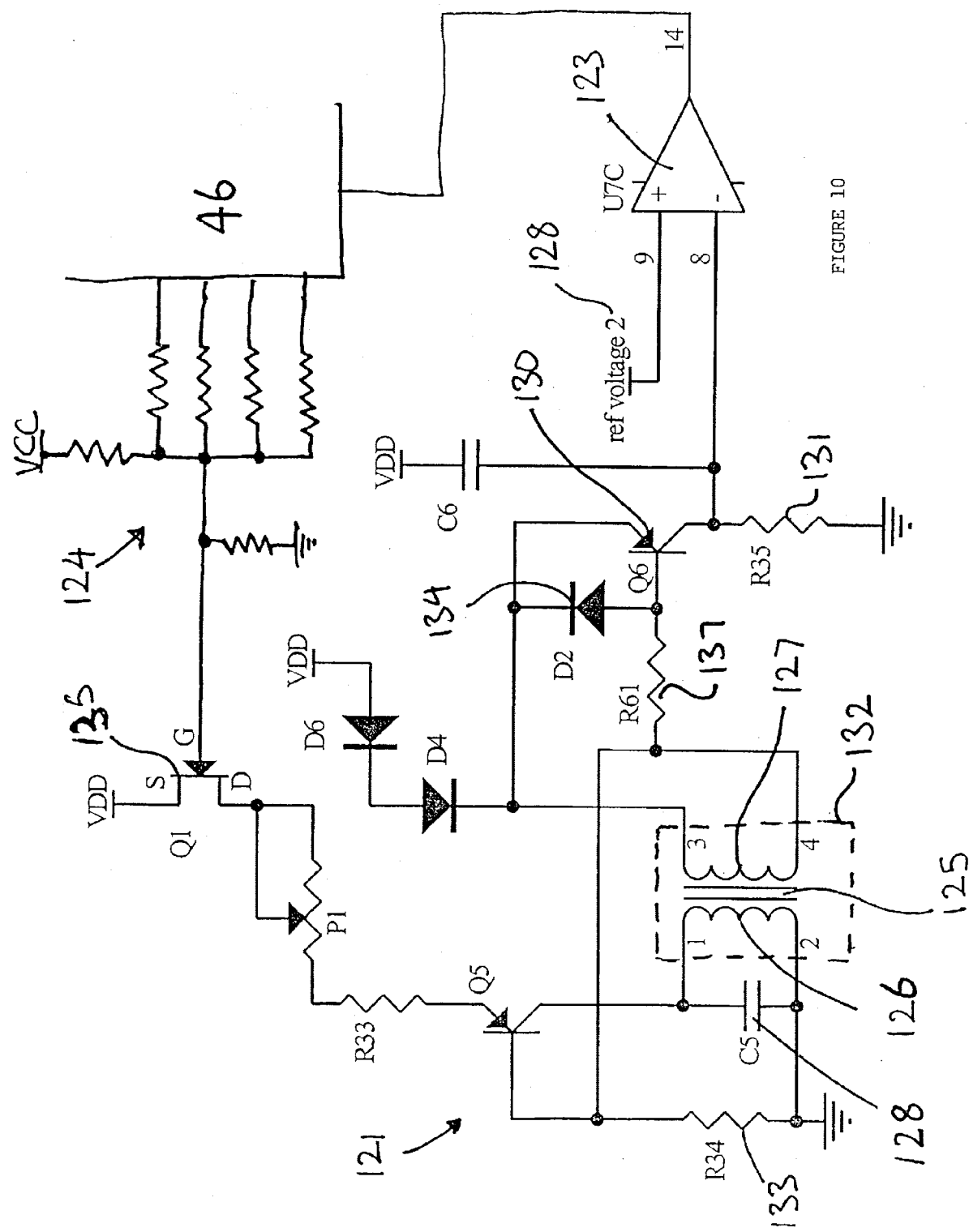
FIG. 10 illustrates a detection circuit for metal objects in a concrete or block wall.
Figure 11:
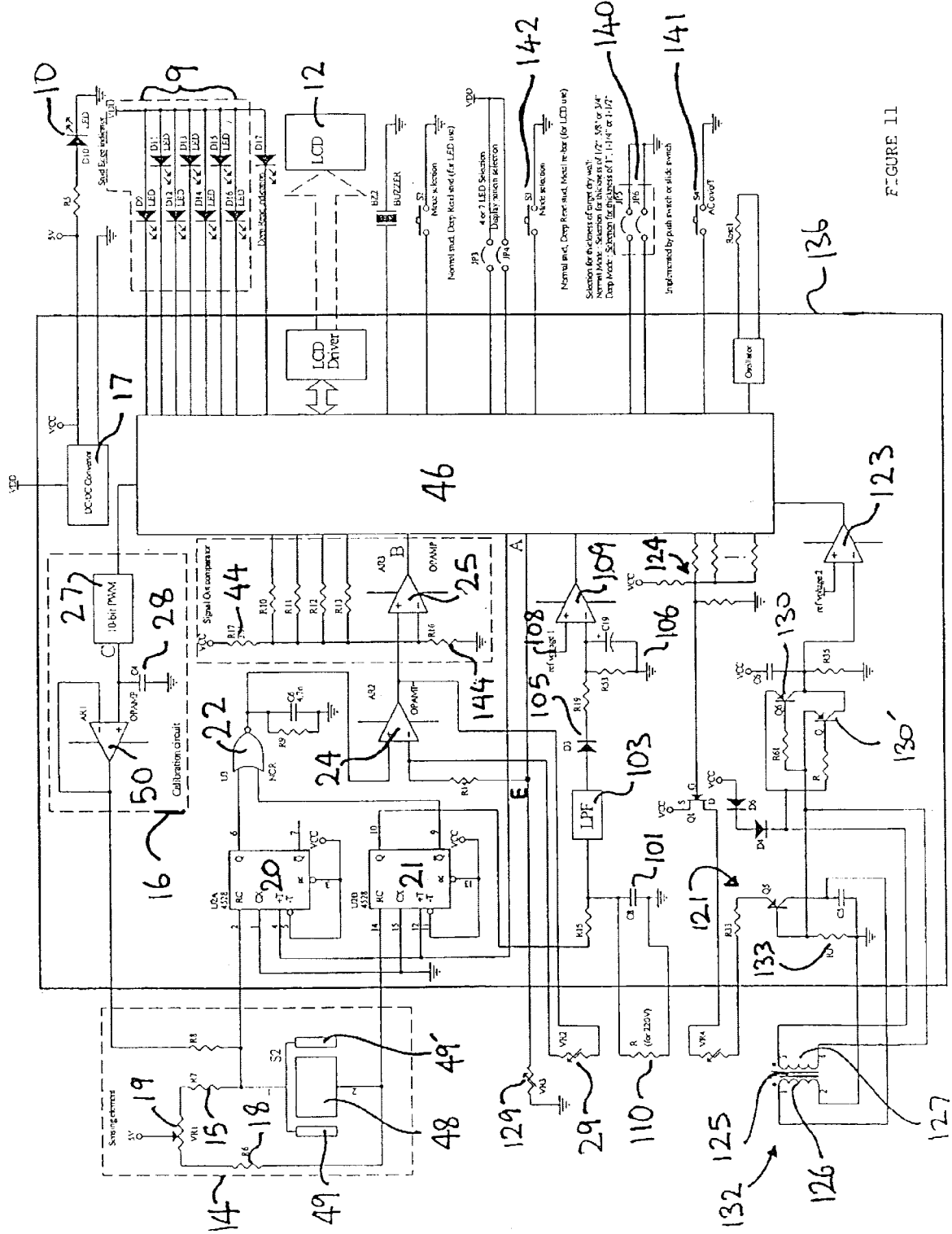
FIG. 11 illustrates a circuit diagram of an embodiment for detecting objects behind drywall, AC wiring and metal objects within concrete and block structures.

FIG. 11 illustrates a circuit diagram for a device for detecting objects behind drywall, AC wiring and metal objects within concrete and block structures. The circuit of FIG. 11 combines the three circuits of FIGS. 3, 8 and 10. In the preferred embodiment the circuit elements within the region defined by frame 136 are incorporated into an Application Specific Integrated Circuit (ASIC). The use of an ASIC reduces unit cost and size.

In the concrete/block detection circuit of FIG. 11 the output of secondary coil 127 is connected to back-to-back transistors 130, 130'. The second transistor 130' replaces diode 134 to allow bi-directional current flow through the second coil 127 to reduce voltage drift. The second transistor is better at minimizing voltage drift than diode 134 on account of its identical structure to transistor 130.

FIG. 12 illustrates an alternative embodiment of the invention. Like reference numerals represent like feature from FIGS. 1 and 2. The indicator LEDs are replaced with a Liquid Crystal Display (LCD) as mentioned earlier in the description. The alternative embodiment also includes the addition of extra user buttons 140 and 141. The sensitivity push button 8 is replaced by a multi-function mode push button 142.

A mode button 142 on front panel 5 duplicates the function of deep read button 8 as well as providing selection of the different detection modes for drywall and objects within concrete/block structures. By pressing the mode button 142 consecutively the user can select between drywall detection, block/concrete detection, deep read for drywall, and deep read for concrete/block. Button 141 on front portion 5 is provided to select AC wire detection.

A switch 140 allows the user to configure the device to a sensitivity optimised to a particular wall covering thickness. The switch 140 performs the same function as jumpers 42, 43 discussed earlier in the description. When the device is set for normal drywall detection the user can select between ½-inch, ⅝-inch and ¾-inch wall thicknesses by consecutive presses of switch 140. If deep read for drywall is selected by pressing mode button 142 the user can select between three thicker wall linings of 1-inch, ⅓-inch and 1½-inches. Deep read mode can be selected for AC detection in the same manner.

By allowing the user to optimise the detection sensitivity for different wall thicknesses higher detection resolution over a greater length of wall thicknesses is achievable and thus the device is more useful to the end user.

Where in the foregoing description reference has been made to integers or elements having known equivalents then such are included as if individually set forth herein.

Embodiments of the invention have been described, however it is understood that variations, improvements or modifications can take place without departure from the spirit or scope of the invention.

What is claimed is:

1. A device for locating an object behind a wall lining including:
   a housing having front sides, and a grip on the sides for gripping of the housing by a user's hand,
   a sensor for sensing an object behind a wall lining and providing an output signal representative of proximity of the object to the device,
   a display on the front for indicating location of the object,
   a controller positioned in the housing, receiving the output signal, and providing an indication of the location of the object on the display, and a switch positioned on one of the sides adjacent the grip operable by the user's thumb or forefinger of the user's hand gripping the housing without substantially altering gripping of the housing.

2. The device of claim 1 wherein the switch is positioned near an edge of the housing.

3. The device of claim 1 wherein the switch is an on-off push-button.

4. The device of claim 1 including a detection indicator, a sensitivity indicator, and an on-off indicator positioned on the front and wherein the detection indicator, the sensitivity indicator, and the operation indicator include different colors.

5. A device for locating an object behind a wall lining including:
   a sensor comprising a first capacitor plate having a first capacitance, and a pair of second capacitor plates having a second capacitance and positioned on opposite sides of the first capacitor plate,
   a detection circuit coupled to the sensor and providing a signal proportional to an imbalance between the first and second capacitances,
   a display for indicating location of an object behind a wall lining,
   a controller receiving the signal and providing an indication of the location of the object on the display, and
   a pulse train generator and an integrator providing a calibration voltage to the sensor.

6. The device of claim 5 wherein
   the pulse train generator includes a pulse width modulator, and
   duty cycle of the pulse width modulator is controlled by the controller.

7. The device of claim 5 wherein
   the sensor includes at least two resistors in electrical communication with the first capacitor plate and the pair of second capacitor plates to provide two resistor-capacitor networks, and
   an output of the integrator biases the two resistor-capacitor networks.

8. The device of claim 6 wherein the detection circuit, the controller, the pulse width modulator, and the integrator are in a single integrated circuit.

9. A device for locating an object behind a wall lining including:
   a housing,
   a sensor comprising a first capacitor plate having a first capacitance, and a pair of second capacitor plates having a second capacitance and positioned on opposite sides of the first capacitor plate,
     a detection circuit having an amplifier, coupled to the sensor, and providing a signal proportional to an imbalance between the first and second capacitances,
     a display for indicating location of an object behind a wall lining,
     a controller receiving the signal and providing an indication of the location of the object on the display, and
     a switch located on the housing and operable by a user of the device for selecting gain of the amplifier.

10. The device of claim 9 wherein the switch is a pushbutton switch.

11. A method of detecting objects behind a wall lining including:
    providing a sensor including at least two resistors, a first capacitor plate and a pair of second capacitor plate in electrical communication, providing two resistor-capacitor networks, the two resistor-capacitor networks having resistor-capacitor time constants,
    providing a pulse train having a duty cycle and applying a voltage to the two resistor-capacitor networks,
    providing a detection circuit and controller detecting an imbalance in the resistor-capacitor time constants, and
    sensing an imbalance in the resistor-capacitor time constants and manipulating the duty cycle to ameliorate the imbalance.

12. The method of claim 11 further including sensing a second imbalance in the resistor-capacitor time constants caused by an object behind a wall lining and producing a signal proportional to the second imbalance.

13. The method of claim 11 wherein the pulse train is provided by a pulse width modulator, and including an integrator connected to the output of the pulse width modulator.

14. A device for locating an object behind a wall lining including:
    a housing,
    a sensor comprising a first capacitor plate having a first capacitance and a pair of second capacitor plates having a second capacitance, the pair of second capacitor being positioned on opposite sides of the first capacitor plate,
    a detector providing a signal proportional to an imbalance between the first and second capacitances,
    a reference circuit for providing a reference signal,
    a comparator for comparing the signal to the reference signal and providing an output based on the comparing,
    a display for indicating location of the object,
    a controller receiving the output and providing an indication of the location of the object on the display, and
    an input device located on the housing and operable by a user of the device for varying the reference signal between at least two values.

15. The device of claim 14 wherein the at least two values are optimized for two or more wall lining thicknesses selected from ½, ⅝, ¾, 1, 1¼ and 1½ inches.

16. The device of claim 14 wherein the reference circuit comprises a voltage divider having a plurality of resistor elements connectable in parallel, the input device selectively connecting different ones of the resistor elements in parallel.

17. A device for locating an object behind a wall lining including:
    a first capacitor plate having a first capacitance,
    a pair of second capacitor plates having a second capacitance, the pair of second capacitor plates being positioned on opposite sides of the first capacitor plate,
    a first detection circuit coupled to the first and second capacitor plates and providing a first signal proportional to an imbalance between the first and second capacitances,
    a second detection circuit coupled to the first capacitor plate and providing a second signal proportional to an alternating signal induced in the first capacitor plate,
    a display for indicating location of the object, and
    a controller receiving the first and second signals and providing an indication of the location of the object on the display.

18. The device of claim 17 further including selection means for indicating to the controller and outputting on the display which of the first and second detection circuits is in use.

19. The device of claim 18 wherein the device further includes a ferrite core with at least two windings and a third detection circuit coupled to a first of the two windings for detecting a change in voltage of the first winding, and selection means for indicating to the controller and outputting to the display which of the first, second, and third detection circuits is in use.

20. The device of claim 19 wherein the selection means includes a push button switch operable by a user.

21. The device of claim 19 wherein the selection means includes a first push button operable by a user for selection between the first and second detection circuits and a second push button operable by the user for selection of the third detection circuit.

22. The device of claim 19 wherein the selection means includes a first push button operable by a user for selection between the first and third detection circuits and a second push button operable by the user for selection of the second detection circuit.

23. The device of claim 19 wherein the third detection circuit includes means for controlling current flow in two directions through the first winding.

24. The device of claim 23 wherein the means for controlling current flow in two directions through the first winding includes a diode and transistor.

25. The device of claim 23 wherein the means for controlling current flow in two directions through the first winding includes back-to-back transistors.

26. A device for locating an object behind a wall lining including:

a first capacitor plate having a first capacitance, a pair of second capacitor plates having a second capacitance, the pair of second capacitor plates being positioned on opposite sides of the first capacitor plate, a ferrite core with at least two windings, a first detection circuit coupled to the first and second capacitor plates and providing a first signal proportional to an imbalance between the first and second capacitances, a second detection circuit coupled to a first of the windings and detecting a change in voltage of the first winding, a display indicating location of the object, and a controller receiving the first and second signals and providing an indication of the location of the object on the display.

* * * * *